Figure 1:
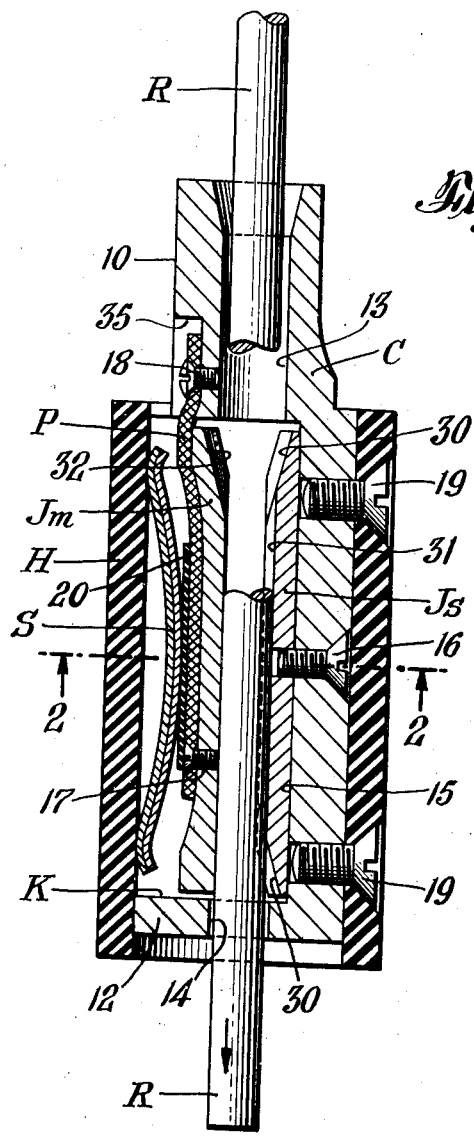

July 3, 1945.　　　　A. W. BAIRD　　　　2,379,470
ELECTRIC WELDING APPARATUS
Filed Dec. 23, 1943

INVENTOR
ALBERT W. BAIRD
BY
ATTORNEY

Patented July 3, 1945

2,379,470

UNITED STATES PATENT OFFICE 2,379,470

ELECTRIC WELDING APPARATUS

Albert W. Baird, Cranford, N. J., assignor to The Linde Air Products Company, a corporation of Ohio Application December 23, 1943, Serial No. 515,381

7 Claims. (Cl. 219—8)

This invention relates to electric welding apparatus and particularly to an improved guide and contact jaw assembly for welding rods, especially adapted for continuous electric welding operations wherein the current conducting members of the welding apparatus are required to carry current of very high amperage.

In continuous electric welding operations wherein a welding rod progressively slides against means establishing electrical contact with said rod, thereby forming another junction in the welding circuit, reliability of operation is a necessity. Excessively high current densities occasioned by contact of the sliding surfaces over an area too narrowly confined, results in a potential difference between contiguous members sufficient to cause arcing at points of imperfect contact. Pitting of the current conducting members results wherever an arc occurs and, since each pit is the focal point of another arc, arcing increases in geometric progression until ultimate destruction of the member soon terminates the welding operation.

In Patent No. 2,314,917, dated March 30, 1943, a contact jaw assembly is provided in which localized areas of high current density are avoided somewhat by substantially surrounding the circumference of the rapidly moving welding rod between a stationary and a movable current conducting member, and by biasing the movable member against the welding rod. Since arcing may also occur across an air gap formed by contact surfaces separated by foreign matter lodged between them, means are provided in such assembly for preventing foreign matter from entering between contacting members, and thus serves to prolong their useful life.

The principal objects of this invention are to provide: in welding apparatus utilizing currents as high as twelve hundred amperes, an improved guide and contact jaw assembly which is capable of handling rods of different diameters; rod contacting means in which wear and arcing are reduced to a minimum; an assembly in which improved biasing means cause relatively long contact jaws to bear against opposite sides of an axially moving welding rod uniformly throughout their length; improved and more free-floating contacting means; an arrangement for conducting current to contacting means which will not interfere with its free-floating character; an improved guide and contact jaw assembly for an axially moving welding rod, which assembly is simple and economical in its parts, compact, is highly heat resistant, effectively excludes foreign matter, and has a remarkably long life.

Other objects and advantages will become apparent from the following description and appended claims taken in connection with the accompanying drawing which illustrates welding apparatus embodying principles of this invention.

Figure 2:
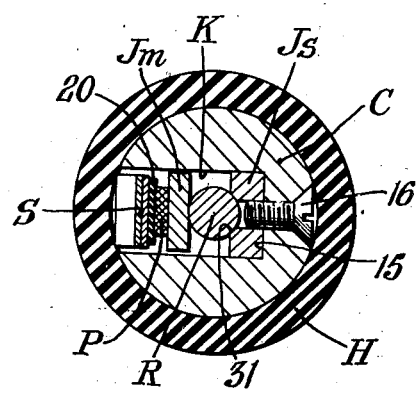

In the drawing:

Fig. 1 is a vertical sectional view of a welding rod guide and contact jaw assembly exemplifying the invention; and Fig. 2 is a view in cross section taken on line 2—2 of Fig. 1 of the assembly.

In general, the improved rod guide and contact jaw assembly of the invention comprises two elongated current conducting jaws, one stationary and one movable. The movable jaw normally is biased or urged toward the stationary jaw, so that both jaws make electrical contact with a welding rod interposed between the two jaws. The biasing force urging the movable jaw toward the stationary jaw is so applied by suitable spring means that uniform bearing pressure is developed throughout the cooperating contacting surfaces. Since the apparatus is so arranged that this force is unopposed by any other, sliding electrical contact of the two elongated jaws against a welding rod is obtained over a wide area and with no variation in potential difference at the sliding contacting surfaces. The same efficient contact between the movable jaw and the welding rod is also established between the stationary jaw and the rod because the uniformly distributed contacting presure of the movable jaw is transmitted through the rod and an equal and opposite pressure established against the contacting surface of the stationary jaw. With uniform bearing pressure at all contacting surfaces, uniform wear on these surfaces obtains and there is substantially no arcing at the surface of the rod. To safeguard the contacting jaws from wear or deterioration due to the presence of foreign matter the jaws are entirely enclosed. In addition, improved means are provided for conducting to the jaws electric current of high amperage in a manner hereinafter described.

Referring to the drawing, a bare metal welding rod R is driven axially thereof by rod-feeding means (on a welding head, not shown) through a tubular electrically-conductive coupling member C composed of hardened copper having a stem 10 and a collar 12 provided with entrance and exit rod passages 13 and 14, respectively, for guiding the rod R through the member C. The stem 10 normally is clamped to and depends from a welding head, and a welding current supply cable is electrically connected to the stem 10. The coupling member C has an elongated laterally-opening medial cavity K of substantially rectangular cross section between the guide passages 13 and 14. The cavity K contains the elements which conduct current from the coupling member C to the axially moving welding rod R. Such current conducting elements include a stationary current conducting jaw Js, a movable current conducting jaw Jm, and a flexible pigtail conductor P.

The stationary jaw Js fits against three longitudinal walls of the cavity K and is rigidly held in electrically conductive engagement with the coupling member C and against the bottom wall 15 of the cavity K by a counter-sunk screw 16. The screw 16 engages a threaded bore in the center of the back of the jaw Js, and the face of the latter is symmetrical, with bevelled end surfaces 30, 30, so that either end may be positioned at the entrance passage 13. The jaw Js also has a long central concave rod-contacting surface or groove 31, the radius of which is equal to that of the largest diameter rod to be guided by the assembly.

The movable jaw Jm is loosely suspended or fitted within the cavity K opposite the stationary jaw Js, and has a bevelled surface 32 only at the rod entrance end. The rod-contacting face of the jaw Jm is flat. Both the stationary jaw Js and the movable jaw Jm are composed of hardened beryllium-copper alloy, an electrically conductive metal capable of withstanding wear at somewhat elevated temperatures without losing its property of hardness. The jaws have a contour enabling them effectively to contact a welding rod regardless of its diameter up to the radius of the groove 31. To prevent the end of the rod R from jamming against the top of the jaws as it is inserted into the apparatus, the jaws are bevelled at 30 and 32.

The single pigtail conductor P is composed of a material such as copper braid and normally suspends the movable jaw Jm in the cavity K when the device is in operative position. One end of the pigtail conductor P is further held in contact with the rear surface of the movable jaw Jm by a screw 17 but this fastening in no way adversely influences the free movement of this jaw in a lateral direction. The other end of the flexible conductor P is secured to and maintained in electrical contact with the stem 10 by a screw 18. The upper end of the conductor P and the head of the screw 18 are disposed within a recess 35 in the outer wall of the stem 10. The conductor P is flat and, when the device is on a welding head, suspends the jaw Jm so that such jaw is free to swing or float laterally within the cavity K, the point of connection between the conductor P and the jaw Jm being substantially below the center of the latter. This facilitates movement of the jaw during operation and also when a rod is inserted through the assembly. The jaw is entirely supported by the conductor with the ends of the jaw in spaced relation to the ends 10 and 12 of the cavity K, the longitudinal side walls of the cavity guiding the jaw when it moves toward and away from the welding rod and the stationary jaw.

A cylindrical case H of thermally and electrically insulating material, such as phenol-formaldehyde plastic or cellulose acetate plastic, encloses the coupling member C and covers the longitudinally extending open side of the cavity K. Two countersunk screws 19, 19 in threaded engagement with the coupling member C hold the case H in position thereon. Being of thermally insulating material the cylindrical case H protects nested similar arcuate leaf springs S of flat cross section, the movable jaw Jm, the stationary jaw Js, and the coupling member C, from foreign matter and damage due to the welding operation. The leaf springs S are disposed within the cavity K so that the rounded end portions of the outer spring bear against the inner surface of the case H while the intermediate or central curved portion of the inner spring bears against a strip of electrical and thermal insulation 20, such as phenol-formaldehyde plastic, interposed between the conductor P and the leaf springs S. The bearing member 20 is provided to inhibit any electrical or heat transfer from the conductor P to the inner leaf spring S, thus insuring against loss of temper to the springs.

The jaw Jm is thus suspended within the cavity K in a "free-floating" manner, being biased by the springs S toward the rod R and the cooperating jaw Js. One or any member of springs S may be used depending upon the force required to obtain effective operation of the device. For example, for large diameter rods only one spring may be used, whereas for small diameter rods three or more springs may be necessary. The springs have sufficient compression to hold themselves in place when a rod is not between the jaws as well as when a rod is between the jaws.

When the welding rod R is first inserted between the stationary jaw Js and the movable jaw Jm, the leaf springs S flex and thereby exert a compressive force upon the insulation 20 which force is transmitted through the flat flexible conductor P to the movable jaw Jm. Since the resultant of the biasing forces thus passes substantially through the centroid of the movable jaw, the bearing pressure between the movable jaw Jm and the welding rod R is uniformly distributed over the contacting surfaces. The stationary jaw Js, diametrically opposite the movable jaw Jm, exerts an equal and opposite force upon the welding rod R. One result of the uniform distribution of bearing pressure on the contacting surfaces is uniform wear of the jaws. Another effect is a uniformly distributed potential difference over the entire area of the junction. In prior contacting jaw assembles in which the bearing pressure and consequently wear is uneven, the narrowly confined area sometimes available for conducting electricity resulted in high current densities and correspondingly high resistance drops across surfaces in physical contact. Such high potential difference was at time sufficient to cause arcing across a short air gap and pit the contacting jaws. In an assembly embodying the principles of this invention, however, the useful life of the contacting jaws is greatly prolonged. Since the apparatus is capable also of easy assembly and disassembly, worn contact jaws may be replaced when indicated.

The cylindrical case H and the tubular member C cooperate to enclose the apparatus and prevent entry of foreign matter which may lodge between contact surfaces, establish an air gap, and lead to rapid destruction of the contacting jaws as the result of arc pitting action.

Furthermore, the movable contact jaw biasing springs, being of substantially symmetrical arcuate shape and loose, that is to say, not anchored at either end, provides a novel assembly in which any number of similar springs may be nested together in the same assembly to obtain a desired degree of contact pressure between the rod and the contact jaws. The springs are protected from heat, being positioned so as to bear against heat and electrical insulating members. Each spring is of symmetrical shape, being positioned so that its central curved section bears perpendicularly against the center of the movable jaw through the insulating strip and flat pigtail conductor. The longitudinal side walls of the cavity K guide or hold the spring S against tilting laterally. With this arrangement, the spring always biases the movable jaw toward the welding rod in such manner that there is little likelihood of the jaw locking in a tilted position within the cavity K. This not only facilitates the initial insertion of a welding rod through the assembly, but insures uniform contact pressure throughout the length of the jaw during the welding operation. It also provides less physical contact between the spring and the insulation strip, so that less heat is liable to be conducted to the springs.

Since one contact jaw has a flat contact face and the other contact jaw has a face provided with a concave contact portion or groove, the assembly is capable of taking welding rods of different diameters without changing the jaws, it being only necessary to change the number of the biasing springs. Furthermore, the point of connection between the single flexible flat pigtail conductor which suspends the movable contact jaw within the assembly is below the center of the jaw so that the latter floats more freely within the assembly in operation and opens more readily when a rod, regardless of diameter, is initially inserted through the jaws.

The contact jaw assembly of the present invention comprises only a few simple standard parts that are relatively easy to manufacture and inexpensive, so that worn parts may be readily and inexpensively replaced, and the device is highly compact and has a comparatively long life.

While a specific embodiment of the invention has been described for the purpose of illustrating the principles thereof, it should be understood that the invention may be otherwise embodied and the dimensions and interrelation of parts changed without departing from the principles of the invention.

What is claimed is:

1. Electric welding apparatus including a welding rod guide and contact jaw assembly comprising a tubular member of electrically conducting material having an integral stem at one end provided with a rod entrance passage and an integral collar at the other end provided with a rod exit passage, said tubular member having a medial laterally opening cavity of substantially rectangular cross section, a relatively long stationary rod contact jaw disposed within and fitting against three longitudinal walls of said cavity, means securing the center of said jaw to the bottom wall of said cavity, said jaw being symmetrical and having a concave rod contacting surface and bevelled end surfaces, a relatively long movable rod contacting jaw suspended within said cavity for floating movement toward and away from said stationary jaw, said movable jaw having a flat rod-contacting face and a bevelled surface at the rod entrance end thereof, a flat flexible pigtail conductor connected at one end to said stem above said cavity and connected at the other end to the back of said movable jaw at a point below the center of said movable jaw for supporting the latter in suspension, a strip of insulation disposed over said flat conductor in the area of the center of said movable jaw, arcuate leaf spring means with the central portion thereof bearing against said strip, and an insulating case fitting around said tubular member and covering said cavity so that the opposite end portions of said spring bear against the inner side of the case.

2. A welding rod guide and contact jaw assembly comprising, in combination, a relatively long symmetrical stationary jaw having bevelled end surfaces and a rod-contacting groove, a relatively long movable jaw having a bevelled end surface and a flat rod-contacting surface facing said groove, a single flexible conductor from which said movable jaw is suspended for "free-floating" movement toward and away from said stationary jaw, said flexible conductor being connected to the back of said movable jaw at a point substantially below the center of said movable jaw, and means for biasing said conductor against the center of said movable jaw for urging the movable jaw toward said stationary jaw.

3. A welding rod guide and contact jaw assembly comprising, in combination, a relatively long movable jaw, a flat flexible conductor suspending said jaw for swinging movement about a point above said jaw, means for guiding said jaw for swinging movement in a plane passing through the longitudinal axis of said conductor, and an arcuate leaf spring biasing said jaw into contact with an axially moving rod, said spring being disposed so that the central portion thereof is located opposite the central portion of said jaw.

4. A welding rod guide and contact jaw assembly comprising, in combination, a relatively long movable jaw; a flat flexible electrical conductor suspending said jaw for swinging movement about a point above said jaw; means for guiding said jaw for swinging movement in a plane passing through the longitudinal axis of said conductor; an arcuate leaf spring adapted to bias said jaw into contact with a welding rod moving axially through said assembly, said spring being disposed so that a portion intermediate its ends is located opposite the central portion of said jaw; and a bearing member of thermal and electrical insulating material engaging such intermediate portion of said arcuate spring and disposed between said spring and said conductor to protect said spring from becoming overheated and thereby losing its temper.

5. A welding rod guide and contact jaw assembly comprising, in combination, a stationary jaw, a movable jaw, one of said jaws having a flat rod-contacting face and the other jaw having a rod-contacting groove opposite said face, means suspending said movable jaw for free-floating movement, and means biasing said movable jaw toward said stationary jaw comprising a plurality of nested arcuate leaf springs, the number of said springs depending upon the biasing force required, the construction and arrangement of said groove and flat face being such that a rod of any radius up to that of said groove may be used in said assembly.

6. A welding rod guide and contact jaw assembly comprising, in combination, a body member having an elongated cavity therein open at one side lengthwise of said member; a stationary current conducting jaw secured to said body within said cavity; a movable current conducting jaw within said cavity and movable toward and away from said stationary jaw; a flexible current conductor having one end thereof secured to said body member and the other end thereof secured to said movable jaw; means closing such open side of said cavity; and a leaf spring within said cavity, said spring having rounded end portions bearing against such closing means and also having a rounded central portion bearing against said movable jaw.

7. A welding rod guide and contact jaw assembly, as claimed in claim 6, wherein a portion of said flexible conductor is disposed between said movable jaw and said spring.

ALBERT W. BAIRD.